US008645823B1

(12) United States Patent
Thiess

(10) Patent No.: US 8,645,823 B1
(45) Date of Patent: Feb. 4, 2014

(54) CONVERTING STATIC WEBSITES TO RESOLUTION INDEPENDENT WEBSITES IN A WEB DEVELOPMENT ENVIRONMENT

(75) Inventor: Peter Thiess, Borstel-Hohenraden (DE)

(73) Assignee: Adobe Systems Incorporated, San Jose, CA (US)

( * ) Notice: Subject to any disclaimer, the term of this patent is extended or adjusted under 35 U.S.C. 154(b) by 1212 days.

(21) Appl. No.: 12/259,984

(22) Filed: Oct. 28, 2008

(51) Int. Cl.
*G06F 17/00* (2006.01)

(52) U.S. Cl.
USPC ............ 715/252; 715/234; 715/243; 715/255

(58) Field of Classification Search
USPC ......... 715/200, 243–247, 249, 255, 271–273, 715/252, 234
See application file for complete search history.

(56) References Cited

U.S. PATENT DOCUMENTS

| | | | | |
|---|---|---|---|---|
| 6,978,418 B1 * | 12/2005 | Bain et al. | ...................... | 715/205 |
| 6,982,729 B1 * | 1/2006 | Lange et al. | ................... | 345/660 |
| 7,337,392 B2 * | 2/2008 | Lue | ................ | 715/236 |
| 7,437,376 B2 * | 10/2008 | Sikchi et al. | ................... | 715/751 |
| 7,584,423 B2 * | 9/2009 | Rohrabaugh et al. | ......... | 715/238 |
| 7,777,902 B2 * | 8/2010 | Ternasky et al. | ............. | 358/1.15 |
| 7,823,083 B2 * | 10/2010 | Rohrabaugh et al. | ......... | 715/815 |
| 7,831,926 B2 * | 11/2010 | Rohrabaugh et al. | ......... | 715/800 |
| 7,844,889 B2 * | 11/2010 | Rohrabaugh et al. | ......... | 715/200 |
| 2002/0178290 A1 * | 11/2002 | Coulthard et al. | ............ | 709/246 |
| 2003/0137522 A1 * | 7/2003 | Kaasila et al. | ................. | 345/619 |
| 2004/0111672 A1 * | 6/2004 | Bowman et al. | .............. | 715/513 |
| 2005/0131887 A1 * | 6/2005 | Rohrabaugh et al. | ............. | 707/3 |
| 2006/0284878 A1 | 12/2006 | Zimmer | | |
| 2007/0132787 A1 * | 6/2007 | Ko | ............................... | 345/660 |
| 2007/0171233 A1 | 7/2007 | Zimmer | | |
| 2007/0288855 A1 * | 12/2007 | Rohrabaugh et al. | ......... | 715/760 |

OTHER PUBLICATIONS

"Resolution Independent UI Release Notes for Mac OS X v10.4," http://developer.apple.com/releasenotes/GraphicsImaging/RN-ResolutionIndependentUI/, Apple Inc., usdated Apr. 29, 2005, pp. 1-4.
"How to Create Resolution Independent Web Pages," http://windyroad.org/2007/05/18/resolution-independent-web-design/, Windy Road Technology Pty Limited, posted May 18, 2007, pp. 1-9.

* cited by examiner

*Primary Examiner* — Chau Nguyen
(74) *Attorney, Agent, or Firm* — Kilpatrick Townsend & Stockton LLP

(57) ABSTRACT

Conversion of static web pages into resolution independent websites is disclosed through a web development environment (WDE). The HTML document defining the website to be converted is parsed to generated a document object model (DOM) of each scalable entity within the website. Access points are defined in order to provide searchable access to the scalable entities. Using these access points, the static properties are updated to reflect resolution independent relative properties. The images are then normalized according to a targeted resolution and size. Once these processes have been performed the updated HTML document and images are then uploaded and deployed to a web server.

24 Claims, 4 Drawing Sheets

CONVERTING STATIC WEBSITES TO RESOLUTION INDEPENDENT WEBSITES IN A WEB DEVELOPMENT ENVIRONMENT

CROSS-REFERENCE TO RELATED APPLICATIONS

The present application is related to commonly-assigned, co-pending patent application Ser. No. 10/688,062, entitled, "LIVE-SERVER CONTENT STAGING," the disclosure of which is incorporated herein by reference for all purposes.

TECHNICAL FIELD

The present teachings relate, in general, to web development environments, and, more particularly, to converting static websites to resolution independent websites in a web development environment.

BACKGROUND

Access to the Web is relatively open and available to users across a variety of different platforms using a variety of different devices. Designing intuitive, usable, and aesthetically pleasing websites is an important part of Web development projects. The graphical layout of a Web page presents applications, graphics, and other information in such a way that is not only pleasing and natural to the eye of the user but also operates to efficiently convey the information or experience that the website designer intends to convey. Access to the Web is relatively open and available to users across a variety of different platforms using a variety of different devices. However, websites are typically designed with a specific display size and resolution in mind. These websites will be displayed as intended when displayed on devices that have the size and resolution of that it has been designed for (i.e., the "design dimension"). For all other sizes and resolutions, the visual presentation will be changed.

When displaying a website at a resolution higher than the design dimension resolution, straight scaling is generally used, in which the various display objects are up-sampled to generate the larger image, for example, using linear or bicubic interpolation. However, up-scaling tends to blur edges thus, detracting from the appearance of the website. When displaying a website at a resolution lower than the resolution that the website was designed for, scaling is again typically used, in which the display objects are down-sampled to remove image data in order to reduce the size of objects. Reduction typically produces better results. However, when such scaling is performed by the web browser, the results are limited. Furthermore, because the target resolution is generally unknown when the designer develops the website at the design dimension resolution, the reduced-resolution may result in odd-sized lines which distort the appearance of the website.

Another consequence of displaying websites at resolutions different than the design dimension resolution is the organization of the web objects and images. Designers expend a great deal of effort to design precise distances between various objects and images and selecting font sizes that are optimal for readability. When displayed at resolutions different than the design dimension resolution, the distances between the various objects begin to move and scaled fonts may become difficult to read. If the width of the website becomes larger than the viewable screen space, horizontal scroll bars will appear that allow the user to move to the other parts of the website. While many users are used to scrolling websites in the vertical direction, horizontal scrolling can lead to a disjointed and unpleasant user experience when accessing the website.

One solution that has been used to alleviate resolution problems has been to create resolution-independent websites. Resolution-independent websites typically define the appearance and display of their content using relative conditions. For example, one unit of measurement that is used in Web design protocols and properties, such as cascading style sheets (CSS), and the like, is the "em." The em is a unit of arbitrary resolution that is used as the design space of a digital font. Imaging systems work by scaling the em to a specified font size of an element or parent of an element in which the em unit is placed. For instance, within a first paragraph tag, the font size may be 12 points. Thus, the unit "1 em" within this paragraph element would be equivalent to 12 points. If this particular paragraph element inherits its font size attribute from a parent element of some sort, then the em unit will be set to the font size of that parent element. Thus, in the preceding example, even though the paragraph font size is 12 points, the parent element has a font size of 10 points. Therefore, the unit 1 em within that paragraph would now be equivalent to 10 points.

In addition to the em unit, CSS also provides the relative units of ex and px. Ex, which stands for x-height, refers to the distance between the baseline and the mean line in a particular typeface. This is typically the height of a small letter of the particular font. Thus, as with the em measurement, is relative to the current font size. Px, which stands for pixel, refers to the size of one pixel. Here, using px, instead of defining a size relative to a font, the size is being defined relative to the pixel size of the display device. Additionally, CSS allows to use percentages to define the size of certain objects, such as text. The percentages are also relative a current unit or measurement in the web page (e.g., 50% of the current size, 70%, 125%, or the like). Using these relative units of measurement, designers may not only define font size in a relative way, but also define other structural elements, such as margins, padding, line width, and the like, using relative units.

In addition to providing scalable text and web page structure using the relative units to define web object properties, resolution independent websites also account for image resizing. Web browsers are capable of resizing images. However, the resulting images, which are resized by the web browsers using the up-sampling and down-sampling described above, often become distorted and visually displeasing to the user. Resolution independent design attempts to address these issues in certain applications by providing a very high quality image file on the web server. When the dimensions of the target device and window are known, the web server applies a resizing process which produces much more favorable results to the resulting web page. The processing capabilities of a web server are typically much greater than a web browser. Thus, using a much more complex resizing algorithm will generally product much more favorable results when resizing the target elements to higher or lower resolutions. As different devices having different resolutions request the same image, the web server may also store those resized versions, such that, if another device requests the same image at the same resolution size, instead of processing the main image again, the stored, resized image is downloaded to the requesting device.

Resolution independent websites generally provide a more pleasing presentation that is maintained across various device sizes and resolutions. However, creating resolution independent websites or converting static websites into resolution independent websites is extremely time consuming and, therefore, costly. In order to create or convert resolution independent websites, web developers typically need to be very familiar with CSS programming and server-side script programming for controlling any image resizing activities that would be needed for scaling images. In converting existing, static web pages, developers would have to replace the absolute measurements with relative measurements, in addition to updating each call to an image for the web page. Moreover, web-optimized image files would be replaced with high quality image files. Therefore, novice users or designers would be effectively prevented from implementing such websites without expending considerable costs.

BRIEF SUMMARY

Representative embodiments of the present teachings are directed to converting static web pages into resolution independent websites through a web development environment (WDE). The HTML document defining the website to be converted is parsed to generated a document object model (DOM) of each scalable entity within the website. Access points are defined in order to provide searchable access to the scalable entities. Using these access points, the static properties are updated to reflect resolution independent relative properties. The images may then be normalized according to a targeted resolution and size. Once these processes have been performed the updated HTML document and images are then uploaded and deployed to a web server.

Additional representative embodiments of the present teachings are directed to methods that include generating a document object model (DOM) identifying one or more scalable entities of a web document within a WDE, establishing one or more access points representing the scalable entities, and updating one or more static display properties related to the scalable entities with one or more relative display properties using the access points.

Further representative embodiments of the present teachings are directed to systems that include memory coupled to a processor and a conversion application stored in the memory. When executed by the processor, the conversion application includes a parser configured to parse a web document into a document object model (DOM) of one or more scalable entities residing in the web document, an access point generator configured to provide identifiable access points for each of the scalable entities, and a measurements editor configured to replace each of the scalable entities that are static measurement references with relative measurement references.

Still further representative embodiments of the present teachings are directed to computer program products having a computer readable media with computer program logic recorded thereon. The computer program products include code for generating a document object model (DOM) identifying one or more scalable entities of a web document within a WDE, code for establishing one or more access points representing the scalable entities, and code for updating one or more static properties related to the scalable entities with one or more relative display properties using the access points.

The foregoing has outlined rather broadly the features and technical advantages of the present teachings in order that the detailed description that follows may be better understood. Additional features and advantages of the disclosure will be described hereinafter which form the subject of the claims. It should be appreciated by those skilled in the art that the conception and specific embodiment disclosed may be readily utilized as a basis for modifying or designing other structures for carrying out the same purposes of the present teachings. It should also be realized by those skilled in the art that such equivalent constructions do not depart from the spirit and scope of the disclosure as set forth in the appended claims. The novel features which are believed to be characteristic of the teachings disclosed herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following descriptions taken in conjunction with the accompanying drawing, in which.

DETAILED DESCRIPTION

Figure 1:
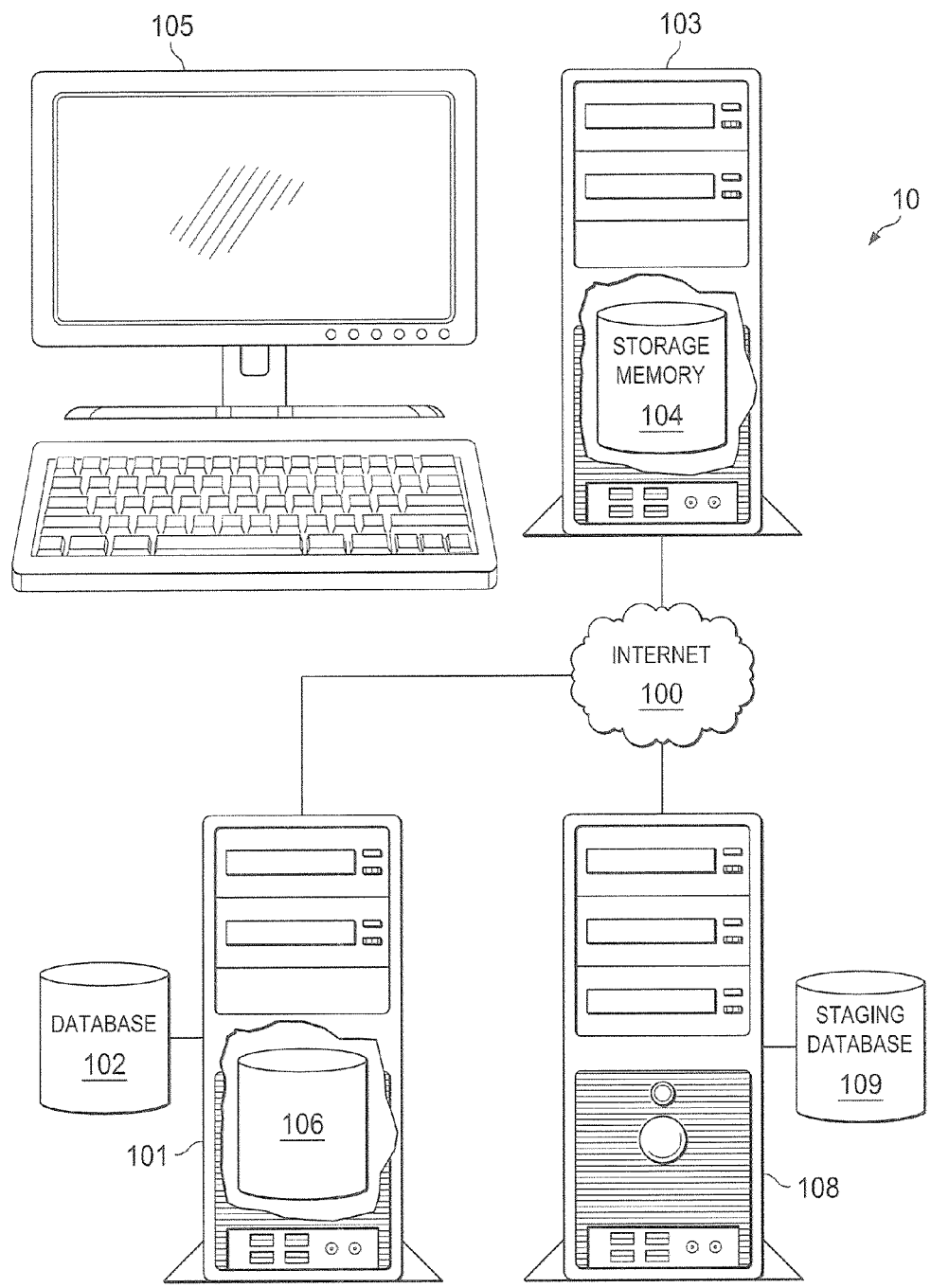
FIG. 1 is a block diagram illustrating a web design environment (WDE) configured according to one embodiment of the present teachings.

FIG. 1 is a block diagram illustrating web design environment 10 configured according to one embodiment of the present teachings. Internet 100 provides the access network for various information and websites, includes any one or more websites provided by web server 101. Web server 101 is coupled to database 102 which stores various data and information that may be used in operation of web server 101 or that may be used when performing web-initiated searches or in generating web pages based on application servers retrieving backend data which will make up the web page to be transmitted to an accessing user. A web developer works at computer 103 using a web development environment (WDE) stored in storage memory 104. The WDE provides the design and development tools that allow the web developer to design and develop web pages that will be a part of a website eventually deployed on web server 101 for access by the public.

The WDE is displayed on display 105 of computer 103 allowing the web developer to enter text code in hypertext markup language (HTML), or an executable logic code, such as PHP, Netscape Communications Corporation's JAVASCRIPT®, Adobe Systems Incorporated's MXML™, Microsoft Corporation's C#™, or the like, or to visually design and develop web pages using a design view canvas which allows the developer to graphically manipulate the simulated visual presentation of the web page under development within the WDE. The WDE will then generate the necessary code to support the graphical changes made by the developer. The WDE will also provide a device-specific preview of the predicted resulting web page by using device-specific metadata for describing how the web page under development will be displayed on that particular device.

Furthermore, staging server 108 along with staging database 109 are used to test any changes that the developer will make to the website under development. Testing in staging server 108 simulates actual deployed conditions and allows the developer to make sure the functional and visual aspects of the resulting website will work and appear as expected. The developer may also test the appearance of the staged website on variously-sized devices in order to confirm that the website will display as expected on such variously-sized devices. Once testing has been completed, the resulting HTML file and supporting files will be uploaded and deployed for public access on web server 101.

It should be noted that in additional and/or alternative embodiments of the present invention, staging server 108 may be implemented using a software server which is also deployed on the same device implementing web server 101. Such technology is described in commonly-assigned, co-pending patent application Ser. No. 10/688,062, entitled, "LIVE-SERVER CONTENT STAGING," the disclosure of which is incorporated herein by reference for all purposes.

In an example of operation, the developer at computer 103 has been tasked with converting website 106, stored on web sever 101, from a static website into a resolution independent website. Website 106 includes a collection of interrelated HTML documents that are linked together in such a fashion to provide the collective site. Each of the HTML documents may also include various dynamic web content, such as scripts, applets, links, or the like, that provide additional information and that may provides executable functionality as well. The web developer downloads a copy of website 106 to storage memory 104 of computer 103. The web developer starts up the WDE and selects the conversion feature to convert website 106 into a resolution independent structure. As will be described in greater detail below, the conversion feature within the WDE parses through the HTML files making up website 106 and generates a document object model (DOM) representing each of the scalable entities within website 106. A scalable entity is any object or element of website 106 that will be affected by changes in size and resolution of the displaying device. Examples of scalable entities include images, text, page elements, and the like. A page element is a display element of a web page that may include buttons, sliders, borders, and the like.

After generating the DOM, the conversion feature updates the static properties and replaces all of the static or absolute measurements with relative measurements that will maintain the visual layout across various different device sizes and resolutions. The conversion feature then replaces the image references and page element entries within the HTML files with server-side calls to a normalized image stored on the web server, such as web server 101, and a server-side resizing script, which would resize the normalized image accordingly and resize any of the page elements for the specified size and resolution. The developer may code the resizing script him or herself, may use an existing resizing script, or may select from various other existing resizing methods or scripts to deploy onto web server 101. It should be noted that advanced scripts and methodologies for resizing various scalable elements of the website under development may be provided by hosted services. Thus, the developer may access one of these hosted services in order to obtain the use of such advanced techniques and code. Once the conversion feature has finished processing the HTML documents making up website 106, the web developer will then test updated website 106 on staging server 108, and then, after testing is finished, re-deploy the files making up website 106 to web server 101, and also store the normalized images and any dynamic web content that are used within website 106 onto to web server 101. If a resizing script does not already exist on web server 101, the user would then upload such a script to web server 101, by selecting or coding such a script, as noted above.

It should be noted that in additional and/or alternative embodiments of the present teaching, the web developer may provide input at computer 103 to assist in handling conversion of any of the scalable entities that may be more complex and that either may not be suitable for an automated resizing based on the resizing script, or that may need more involved coding and scripting to remove their static properties in favor of relative properties that will be more resolution independent.

Figure 2:
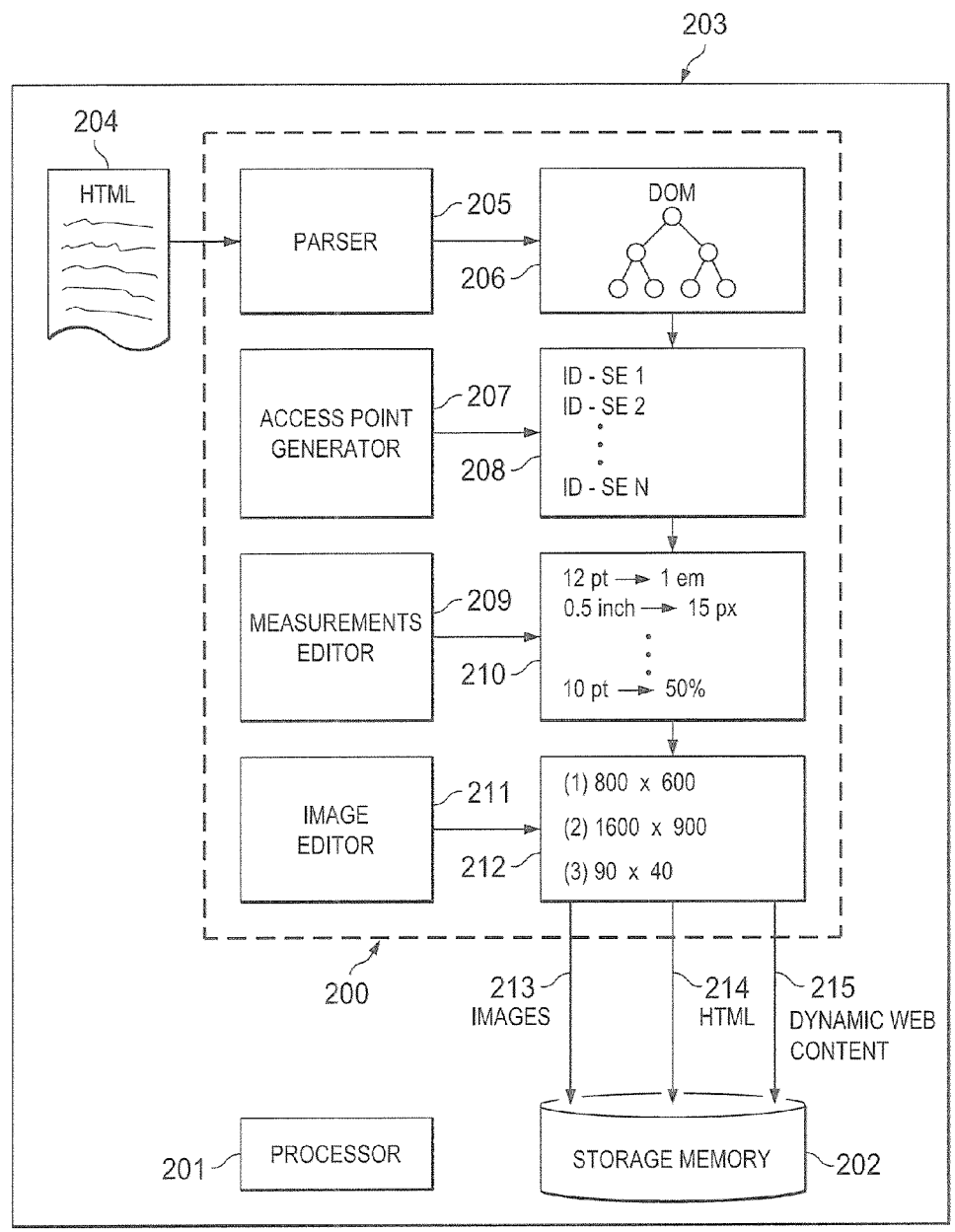
FIG. 2 is a block diagram illustrating a WDE configured according to one embodiment of the present teachings.

FIG. 2 is a block diagram illustrating WDE 200 configured according to one embodiment of the present teachings. WDE 200 resides in storage memory 202 of computer 203. When executed by processor 201, the operational environment of WDE 200 is started. On execution of the resolution independent conversion feature of WDE 200, the user selects to convert HTML file 204. HTML file 204 is parsed by parser 205 to create document object model (DOM) 206 which represents the document model of each of the scalable entities in HTML file 204. After creating DOM 206, access point generator 207 provides access points for processed DOM 208. The identifiable access points inserted into processed DOM 208 by access point generator 207 may comprise elements such as CSS ID selectors, property names, element types, or the like. The purpose of such access points is to provide a searchable identifier of the particular position within processed DOM 208 that includes the scalable entities, such as static or absolute measurements, images, or the like.

With the access points inserted, measurements editor 209 searches for each access point related to static or absolute measurements and replaces those with relative measurement or relative units in measurement processed DOM 210. Image editor 211 processes measurement processed DOM 210 further by identifying the scalable entities that represent images using the access points. Image editor 211 rewrites the image references and any page element references in image processed DOM 212 changing the references to call a normalized image and an image resizing script, in the case of images, and just calling the resizing script, in the case of page elements, from the web server. Image editor 211 also establishes the normalized images that will be used for generating the images downloaded to the browsers displaying the web page.

In order to establish these normalized images, the intended resolution of the ultimate website is identified and this resolution is used to identify the full resolution of the intended website. This image resolution is then used as the starting point for any resizing that will be done by the server side resizing script. The normalized image established by image editor 211 may also be a high resolution image file that would normally be too large to be efficiently used as a website image. Once the images are normalized by image editor 211, the website is stored in storage memory 202 in several main segments: images 213, HTML file 214, and dynamic web content 215, such as scripts, program snippets, applets, or the like. The user may then upload and deploy the website, including images 213, HTML file 214, and dynamic web content 215, on the web server.

Figure 3:
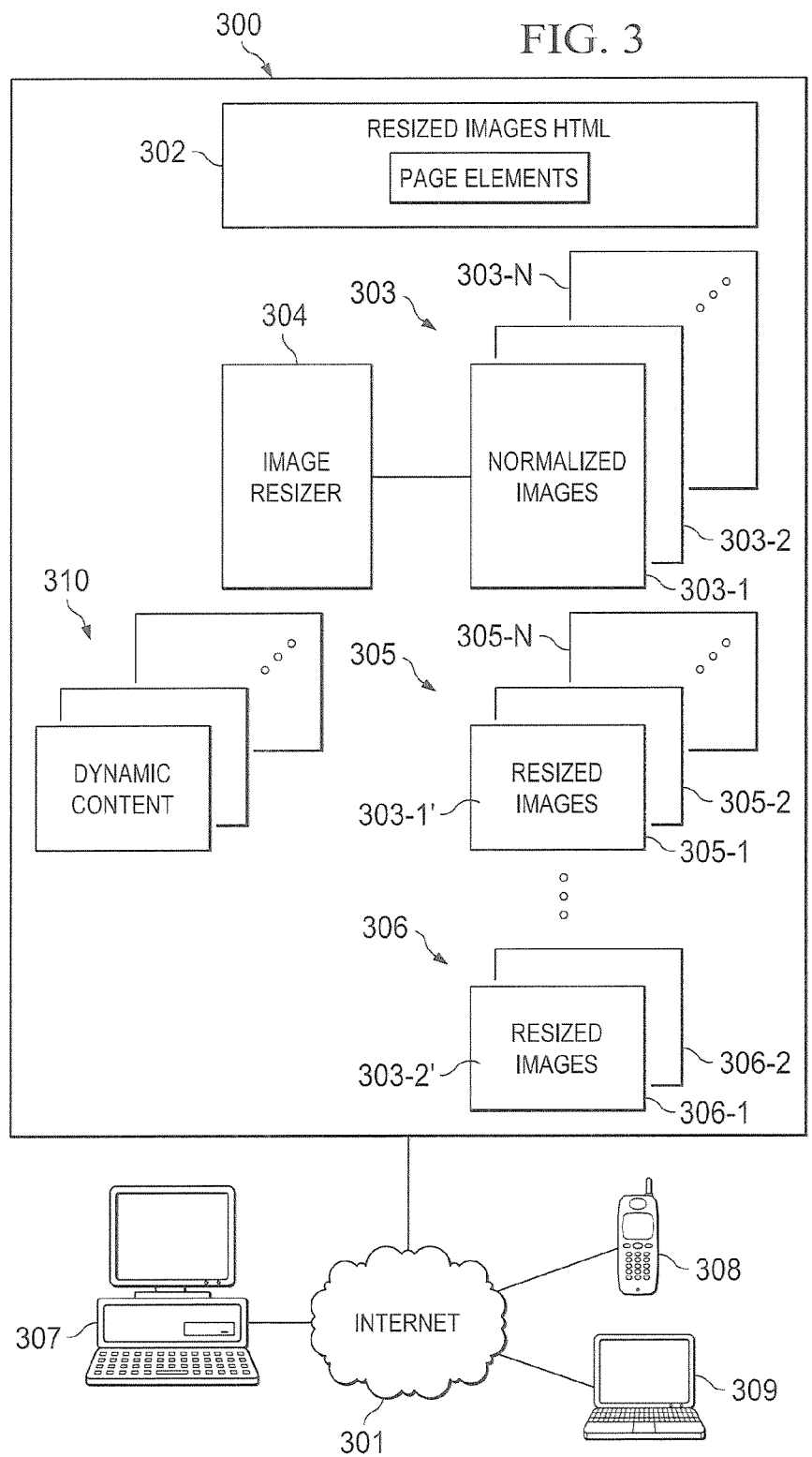
FIG. 3 is a block diagram illustrating a web server including an independent HTML file generated according to one embodiment of the present teachings.

Turning now to FIG. 3, web server 300 is illustrated deploying resolution independent HTML file 302 generated according to one embodiment of the present teachings. Resolution independent HTML file 302 is associated with normalized images 303. In operation, when a user at computer 307 desires to access a website associated with resolution independent HTML file 302, the browser operating on computer 307 issues a hypertext transfer protocol (HTTP) request to web server 300 over Internet 301. Web server 300 downloads resolution independent HTML file 302 to computer 307. As the browser on computer 307 begins interpreting the HTML code, information, such as window size, device size, device resolution, and the like, is transmitted back to web server 300 along with the request for a particular one of normalized images 303, for example normalized image 303-1. The size and resolution information is used by image resizer 304 to control how to resize normalized image 303-1 and how to resize any page elements of resolution independent HTML file 302.

Image resizer 304 resizes normalized image 303-1 and transmits the resized image to the browser on computer 307. The browser inserts the resized image into the intended position of the website. The resized image is also stored at web server 300 as resized image 305-1. Web server 300 saves this resized version, resized image 305-1, in order to increase the efficiency of particular future downloads. When a user at laptop computer 309 attempts to access resolution independent HTML file 302, instead of using image resizer 304 to again resize normalized image 303-1, web server 300 transmits resized image 305-2, which was previously resized to the same resolution as requested by laptop 309. Thus, the transmission time would be greatly reduced to laptop 309. Similarly, when a user at mobile device 308 requests to view resolution independent HTML file 302, a previously resized image 306-2, which was stored in web server 300, is transmitted to mobile. Using the relative measurements along with the resized images, the websites presented are configure to be independent from the particular resolutions.

Figure 4:
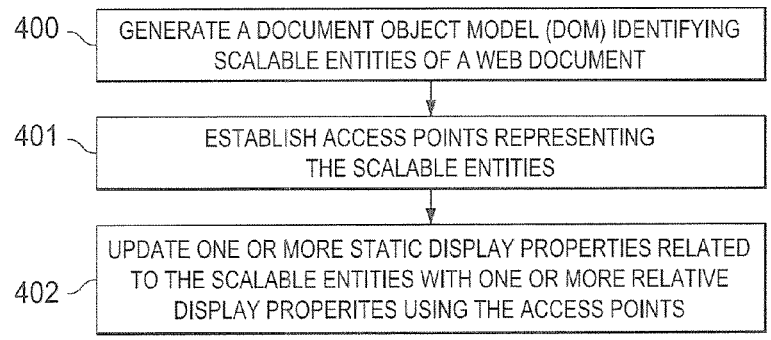
FIG. 4 is a flow chart illustrating example steps executed to implement one embodiment of the present teachings.

FIG. 4 is a flow chart illustrating example steps executed to implement one embodiment of the present teachings. In step 400, a document object model (DOM) is generated identifying one or more scalable entities of a web document. One or more access points are established, in step 401, representing the scalable entities. One or more static display properties related to the scalable entities are updated, in step 402, with relative display properties using the access points.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 5:
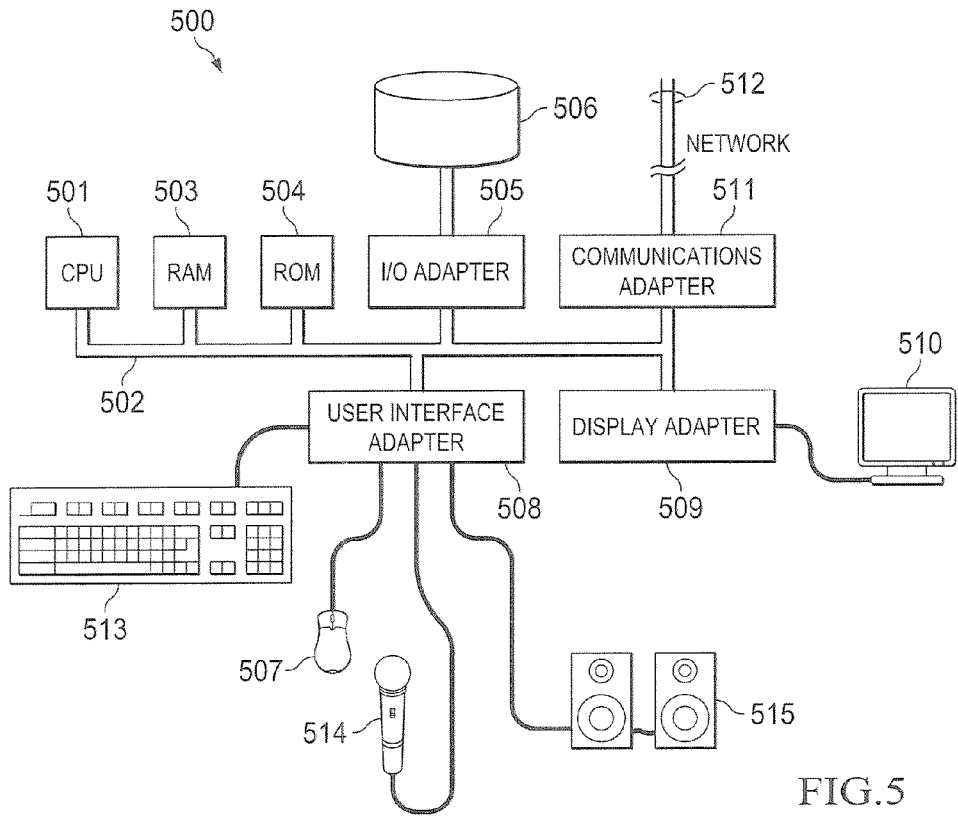
FIG. 5 illustrates an exemplary computer system which may be employed to implement WDEs and the computers on which such WDE's operate, according to certain embodiments.

FIG. 5 illustrates an exemplary computer system 500 which may be employed to implement WDEs and the computers on which such WDE's operate, according to certain embodiments. Central processing unit (CPU) 501 is coupled to system bus 502. CPU 501 may be any general-purpose CPU. The present disclosure is not restricted by the architecture of CPU 501 (or other components of exemplary system 500) as long as CPU 501 (and other components of system 500) supports the inventive operations as described herein. CPU 501 may execute the various logical instructions described herein. For example, CPU 501 may execute machine-level instructions according to the exemplary operational flow described above in conjunction with FIG. 4.

Computer system 500 also includes random access memory (RAM) 503, which may be SRAM, DRAM, SDRAM, or the like. Computer system 500 includes read-only memory (ROM) 504 which may be PROM, EPROM, EEPROM, or the like. RAM 503 and ROM 504 hold user and system data and programs, as is well known in the art.

Computer system 500 also includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as interacting with a user interface provided by a given virtual space being accessed by the user, as described above.

I/O adapter 505 connects to storage device(s) 506, such as one or more of hard drive, compact disc (CD) drive, floppy disk drive, tape drive, etc., to computer system 500. Communications adapter 511 is adapted to couple computer system 500 to network 512, which may enable information to be input to and/or output from system 500 via such network 512 (e.g., the Internet or other wide-area network, a local-area network, a public or private switched telephony network, a wireless network, any combination of the foregoing). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display a WDE and/or other information desired to be displayed, as discussed herein.

It shall be appreciated that the present disclosure is not limited to the architecture of system 500. For example, any suitable processor-based device may be utilized for implementing the WDE and the converting features described herein, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present teaching and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A method comprising:
generating a document object model (DOM) identifying one or more scalable entities of a web document file within a web development environment (WDE);
embedding one or more access points within said DOM representing said one or more scalable entities;
replacing, within said DOM, one or more static properties related to said plurality of scalable entities with one or more relative display properties using said plurality of access points;
modifying said web document file by propagating said one or more relative display properties from said DOM to said web document file to replace said one or more static properties of said scalable entities; and
storing said modified web document file.

2. The method of claim 1 further comprising:
normalizing one or more image files of said web document according to a selected resolution.

3. The method of claim 2 wherein said one or more static properties comprise one or more of:
a static measurement;
an image reference; or
a page element.

4. The method of claim 3 wherein said replacing comprises:
replacing said static measurement with a relative measurement;
replacing said image reference with a call to a resizing script associated with said normalized one or more image files; and
replacing said page element with a call to said resizing script associated with said page element.

5. The method of claim 4 further comprising:
receiving input from a user for said replacing, wherein said input comprises one or more of:
code entered by said user defining said resizing script;
selection of one of a plurality of existing resizing applications defining said resizing script; and
selections of said resizing script residing on a web server identified to maintain said web document.

6. The method of claim 1 further comprising:
downloading said web document from a web server prior to said generating.

7. The method of claim 1 further comprising:
parsing said web document to determine said plurality of scalable entities prior to said generating.

8. The method of claim 1 further comprising:
providing a dimension script in said web document to read a size and resolution of an identified display device, wherein upon loading of said web document into said identified display device, said dimension script transmits said size and resolution to a web server hosting said web document.

9. A system comprising:
memory coupled to a processor;
a conversion application stored in said memory, wherein, when executed by said processor, said conversion application comprises:
a parser configured to parse a web document into a document object model (DOM) of one or more scalable entities residing in said web document file;
an access point generator configured to embed identifiable access points within said DOM for each of said one or more scalable entities;
a measurements editor configured to:
modify said DOM to replace each of said one or more scalable entities comprising a static measurement reference with a relative measurement reference, and
modify said web document file by propagating said one or more relative display properties from said DOM to said web document file to replace said one or more static properties of said scalable entities; and
wherein said conversion application is configured to store said modified web document file.

10. The system of claim 9 wherein said conversion application further comprises:
an image editor configured to rewrite visual element references with calls to a resizing script associated with a normalized version of one or more of said visual element references.

11. The system of claim 10 wherein said image editor of said conversion application is further configured to generate said normalized version using an image file associated with an image element of said visual element references.

12. The system of claim 11 wherein said visual element references comprise one of:
said image file; or
a page element.

13. The system of claim 12 wherein said image editor is further configured to call a resizing script to resize one or more page elements of said visual element references according to a target design dimension.

14. The system of claim 10 wherein said image editor is further configured to receive target design dimensions of a target device on which said web document is targeted for display.

15. The system of claim 9 further comprising:
an input device configured to receive user input associated with said conversion application.

16. The system of claim 15 wherein said user input comprises one or more of:
selection of said web document for conversion in said conversion application;
code entered by said user defining said resizing script;
selection of one of a plurality a existing resizing applications defining said resizing, script; and
selections of said resizing script residing on a web server identified to maintain said web document.

17. A computer program product having a computer readable medium with computer program logic recorded thereon, said computer program product comprising:
code for generating a document object model (DOM) identifying one or more scalable entities of a web document file within a web development environment (WDE);
code for embedding one or more access points within said DOM representing said one or more scalable entities;

code for replacing, within said DOM, one or more static properties related to said one or more scalable entities one or more relative display properties using said one or more access points;

code for modifying said web document file by propagating said one or more relative display properties from said DOM to said web document file to replace said one or more static properties of said scalable entities; and code for storing said modified web document file.

18. The computer program product of claim 17 further comprising:

code for normalizing one or more image files of said web document according to a selected resolution.

19. The computer program product of claim 18 wherein said code for replacing comprises:

code for replacing said static measurement with a relative measurement;

code for replacing said image reference with a call to a resizing script associated with said normalized one or more image files; and code for replacing said page element with a call to said resizing script associated with said page element.

20. The computer program product of claim 19 further comprising:

code for receiving input from a user for said code for replacing, wherein said input comprises one or more of:

code entered by said user defining said resizing script;

selection of one of a plurality of existing resizing applications defining said resizing script; and selections of said resizing script residing on a web server identified to maintain said web document.

21. The computer program product of claim 17 further comprising:

code for downloading said web document from a web server prior to executing said code for generating.

22. The computer program product of claim 17 further comprising:

code for parsing said web document to determine said plurality of scalable entities prior to execution of said code for generating.

23. The computer program product of claim 17 wherein said one or more static properties comprise one or more of:

a static measurement;

an image reference; or a page element.

24. The computer program product of claim 17 further comprising:

code for providing a dimension script in said web document to read a size and resolution of an identified display device, wherein upon loading of said web document into said identified display device, said dimension script transmits said size and resolution to a web server hosting said web document.

* * * * *